United States Patent
Antonyraj et al.

(10) Patent No.: US 11,483,231 B2
(45) Date of Patent: *Oct. 25, 2022

(54) CONTEXT-AWARE PATH COMPUTATION AND SELECTION

(71) Applicant: Zycada Networks, Inc., Campbell, CA (US)

(72) Inventors: Rosarin Roy Antonyraj, Sunnyvale, CA (US); Subramanian Varadarajan, Los Gatos, CA (US)

(73) Assignee: ZYCADA NETWORKS, INC., Campbell, CA (US)

( * ) Notice: Subject to any disclaimer, the term of this patent is extended or adjusted under 35 U.S.C. 154(b) by 115 days.

This patent is subject to a terminal disclaimer.

(21) Appl. No.: 17/002,491

(22) Filed: Aug. 25, 2020

(65) Prior Publication Data

US 2021/0036949 A1 Feb. 4, 2021

Related U.S. Application Data

(63) Continuation of application No. 15/989,077, filed on May 24, 2018, now Pat. No. 10,757,011.

(Continued)

(51) Int. Cl.
*H04L 45/12* (2022.01)
*H04L 67/1004* (2022.01)
(Continued)

(52) U.S. Cl.
CPC ............ *H04L 45/123* (2013.01); *H04L 43/08* (2013.01); *H04L 43/16* (2013.01); *H04L 45/12* (2013.01);
(Continued)

(58) Field of Classification Search
None
See application file for complete search history.

(56) References Cited

U.S. PATENT DOCUMENTS

| 6,256,309 B1 * | 7/2001 | Daley ..................... H04L 45/00 370/395.43 |
| 6,590,867 B1 * | 7/2003 | Ash ....................... H04L 45/302 709/240 |

(Continued)

FOREIGN PATENT DOCUMENTS

WO WO 2016/058417 A1 4/2016

OTHER PUBLICATIONS

Antonyraj, Notice of Allowance, U.S. Appl. No. 15/989,077, dated Feb. 10, 2020, 6 pgs.

(Continued)

*Primary Examiner* — Christopher T Wyllie
(74) *Attorney, Agent, or Firm* — Morgan, Lewis & Bockius LLP (57) ABSTRACT

Exemplary methods, apparatuses, and systems include a path management hub and proxy server nodes that form a mesh network. The hub receives link performance metrics from each of the nodes. The hub determines optimal paths between first and second nodes for each of a plurality of metric types or a combination of metric types using the received link performance metrics. The hub maps a service identifier to a plurality of the determined optimal paths for a context representing one or more link performance metric types. The hub transmits a next hop for each of the plurality of mapped optimal paths along with the mapping to the first node. The first node receives the service identifier mapped to the next hops and traffic for the first connection. In response to determining the received traffic is for the service, the first node selects a first next hop and forwards the traffic.

20 Claims, 4 Drawing Sheets

Related U.S. Application Data (60) Provisional application No. 62/511,261, filed on May 25, 2017.

(51) Int. Cl.
| | |
|---|---|
| *H04L 45/42* | (2022.01) |
| *H04L 67/63* | (2022.01) |
| *H04L 67/1001* | (2022.01) |
| *H04L 43/08* | (2022.01) |
| *H04L 43/16* | (2022.01) |
| *H04L 45/16* | (2022.01) |
| *H04L 45/00* | (2022.01) |

(52) U.S. Cl.
CPC .............. *H04L 45/16* (2013.01); *H04L 45/22* (2013.01); *H04L 45/42* (2013.01); *H04L 67/1001* (2022.05); *H04L 67/1004* (2013.01); *H04L 67/63* (2022.05); *H04L 45/70* (2013.01)

(56) References Cited

U.S. PATENT DOCUMENTS

| | | |
|---|---|---|
| 8,665,841 B1 | 3/2014 | Goel |
| 10,757,011 B2 * | 8/2020 | Antonyraj ............... H04L 43/08 |
| 2003/0099237 A1 * | 5/2003 | Mitra .................... H04L 67/104 |
| | | 370/393 |
| 2006/0268879 A1 * | 11/2006 | Xhafa ...................... H04Q 3/66 |
| | | 370/392 |
| 2008/0304485 A1 * | 12/2008 | Sinha .................. H04W 40/246 |
| | | 370/392 |
| 2010/0262705 A1 * | 10/2010 | Li .......................... H04L 45/302 |
| | | 709/229 |
| 2011/0026437 A1 * | 2/2011 | Roja-Cessa ............. H04L 45/02 |
| | | 370/256 |
| 2014/0160939 A1 * | 6/2014 | Arad ..................... H04L 47/122 |
| | | 370/237 |
| 2014/0344331 A1 | 11/2014 | Johns et al. |
| 2018/0343192 A1 * | 11/2018 | Antonyraj ............... H04L 45/16 |
| 2019/0238449 A1 * | 8/2019 | Michael ................. H04L 45/24 |
| 2019/0288908 A1 * | 9/2019 | Lee ..................... H04L 41/5003 |
| 2020/0413111 A1 * | 12/2020 | Varadarajan ........... H04N 21/84 |
| 2021/0036949 A1 * | 2/2021 | Antonyraj ........... H04L 67/1004 |

OTHER PUBLICATIONS

Zycada Networks, Inc., International Preliminary Report on Patentability, PCT/US2018/034669, dated Nov. 26, 2019, 9 pgs.

Zycadanetworks, Inc., International Search Report and Written Opinion, PCT/US2018/034669, dated Sep. 11, 2018, 12 pgs.

\* cited by examiner

CONTEXT-AWARE PATH COMPUTATION AND SELECTION

RELATED APPLICATION

This application is a continuation of U.S. application Ser. No. 15/989,077, filed on May 24, 2018, entitled "Context-Aware Path Computation and Selection, which is a non-provisional application of U.S. Provisional Patent Application No. 62/511,261, filed May 25, 2017, entitled, "Context-Aware Path Computation and Selection," both of which are hereby incorporated by reference in their entirety.

FIELD OF THE INVENTION

The various embodiments described in this document relate to path computation and selection for a mesh network. In particular, embodiments deliver application or data content across a mesh network of proxy servers by dynamically computing and selecting optimal paths based upon context of the traffic.

BRIEF SUMMARY

There is a need for apparatuses and methods for selecting a transmission path for network traffic. Such systems and methods optionally complement or replace conventional systems for selecting a transmission path.

In accordance with some embodiments, a method includes receiving, by a path management hub, link performance metrics from each of a plurality of proxy server nodes that form a mesh network. Each of the plurality of nodes forms a portion of the mesh network via a link to each of two or more other nodes within the plurality of nodes. The link performance metrics represent a plurality of performance metric types. The method also includes evaluating, by the path management hub in response to receiving the link performance metrics, a plurality of potential paths between respective first and second nodes within the plurality of nodes using the received link performance metrics to determine optimal paths for each of a plurality of metric types and/or a combination of metric types. The method also includes determining, by the path management hub, a context representing one or more link performance metric types to be given preference for a service. The method also includes mapping, by the path management hub, a service identifier for the service to a plurality of the determined optimal paths between the first node and second nodes using the one or more link performance metric types of the determined context. The method also includes transmitting, from the path management hub to the first node, a respective next hop for each of the plurality of mapped optimal paths and the mapping between each respective next hop and the service identifier. The method also includes receiving, by the first node from the path management hub, the service identifier mapped to a plurality of next hops for the plurality of mapped optimal paths. The method also includes receiving, by the first node, traffic for a first connection with the service. The method also includes selecting, by the first node in response to determining the received traffic is for the service, a first next hop mapped to the service identifier of the plurality of next hops for the plurality of mapped optimal paths. The method also includes forwarding, by the first node, the received traffic to the selected first next hop.

In some embodiments, the method also includes tracking, by the first node, link performance metrics for traffic for the service via each of the plurality of next hops. The method also includes determining, by the first node, using the link performance metrics tracked by the first node, that a second next hop mapped to the service identifier of the plurality of next hops received from the path management hub outperforms the first next hop in at least one of the tracked performance metrics. The method also includes receiving, by the first node, traffic for a second connection with the service. The method also includes forwarding, by the first node in response to determining the second next hop outperforms the first next hop, the received traffic for the second connection with the service to the second next hop.

In some embodiments, the method also includes transmitting, by the first node to the path management hub, an indication of the first node using the second next hop to forward traffic for the service and the tracked link performance metrics.

In some embodiments, the method also includes tracking, by the first node, link performance metrics for traffic for the service via each of the plurality of next hops, wherein the link performance metrics tracked by the first node include, for each connection, bytes directed to the service over a period of time and bytes received from the service over a period of time. The method also includes determining, by the first node, using the link performance metrics tracked by the first node, that a ratio of bytes directed to the service to bytes received from the service is above a first threshold value. The method also includes receiving, by the first node, traffic for a second connection with the service. The method also includes, in accordance with a determination that the ratio is above the first threshold value, forwarding, by the first node, the received traffic for the second connection with the service to a second next hop.

In some embodiments, the method also includes tracking, by the first node, link performance metrics for traffic for the service via each of the plurality of next hops, wherein the link performance metrics tracked by the first node include, for each connection, bytes directed to the service over a period of time and bytes received from the service over a period of time. The method also includes determining, by the first node using the link performance metrics tracked by the first node, whether a ratio of bytes directed to the service to bytes received from the service meets first reordering criteria. The method also includes receiving, by the first node, traffic for a second connection with the service. The method also includes, in accordance with a determination that the ratio of bytes directed to the service to bytes received from the service meets the first reordering criteria, forwarding, by the first node, the received traffic for the second connection with the service to a second next hop.

In some embodiments, the method also includes tracking, by the first node, link performance metrics for traffic for the first connection for the service via the first next hop. The method also includes determining, by the first node using the link performance metrics tracked by the first node, that at least one of the link performance metrics for the first connection is above a second threshold value. The method also includes receiving, by the first node, traffic for a second connection with the service. The method also includes, in accordance with a determination that the at least one link performance metric for the first connection is above the second threshold value, forwarding, by the first node, the received traffic for the second connection with the service to the second next hop.

In some embodiments, the method also includes tracking, by the first node, link performance metrics for traffic for the first connection for the service via the first next hop. The method also includes determining, by the first node using the link performance metrics tracked by the first node, that at least one of the link performance metrics for the first connection meets second reordering criteria. The method also includes receiving, by the first node, traffic for a second connection with the service. The method also includes, in accordance with a determination that the at least one link performance metric for the first connection meets the second reordering criteria, forwarding, by the first node, the received traffic for the second connection with the service to the second next hop.

In some embodiments, the link performance metrics include, for each connection, bytes directed to each service over a period of time and bytes received from each service over a period of time. The method also includes determining, by the path management hub using the link performance metrics, whether a ratio of bytes directed to the service to bytes received from the service is above a third threshold value. The method also includes, in accordance with a determination that the ratio of bytes directed to the service to bytes received from the service is above the third threshold value, selecting, by the path management hub, the context representing one or more link performance metric types.

In some embodiments, the link performance metrics include, for each connection, bytes directed to each service over a period of time and bytes received from each service over a period of time. The method also includes determining, by the path management hub using the link performance metrics, whether a ratio of bytes directed to the service to bytes received from the service meets context adjustment criteria. The method also includes, in accordance with a determination that the ratio of bytes directed to the service to bytes received from the service meets the context adjustment criteria, selecting, by the path management hub, the context representing one or more link performance metric types.

In some embodiments, the service identifier mapped to the next hops for the plurality of optimal paths transmitted from the path management hub to the first node includes a mapping to the context representing the one or more link performance metric types.

In some embodiments, the plurality of link performance metric types includes one or more of: bandwidth, requests per second, packet loss, jitter, and latency.

In some embodiments, determining the context representing the one or more link performance metric types to be given preference for the service includes receiving, by the path management hub, a selection of the context.

In accordance with some embodiments, a non-transitory computer-readable medium stores instructions, which when executed by a processing device, cause the processing device to perform a method. The method includes receiving, by a path management hub, link performance metrics from each of a plurality of proxy server nodes that form a mesh network. Each of the plurality of nodes forms a portion of the mesh network via a link to each of two or more other nodes within the plurality of nodes. The link performance metrics represent a plurality of performance metric types. The method also includes evaluating, by the path management hub in response to receiving the link performance metrics, a plurality of potential paths between respective first and second nodes within the plurality of nodes using the received link performance metrics to determine optimal paths for each of a plurality of metric types and/or a combination of metric types. The method also includes determining, by the path management hub, a context representing one or more link performance metric types to be given preference for a service. The method also includes mapping, by the path management hub, a service identifier for the service to a plurality of the determined optimal paths between the first node and second nodes using the one or more link performance metric types of the determined context. The method also includes transmitting, from the path management hub to the first node, a respective next hop for each of the plurality of mapped optimal paths and the mapping between each respective next hop and the service identifier. The method also includes receiving, by the first node from the path management hub, the service identifier mapped to a plurality of next hops for the plurality of mapped optimal paths. The method also includes receiving, by the first node, traffic for a first connection with the service. The method also includes selecting, by the first node in response to determining the received traffic is for the service, a first next hop mapped to the service identifier of the plurality of next hops for the plurality of mapped optimal paths. The method also includes forwarding, by the first node, the received traffic to the selected first next hop.

In some embodiments, the instructions cause the processing device to track, by the first node, link performance metrics for traffic for the service via each of the plurality of next hops. The instructions also cause the processing device to determine, by the first node, using the link performance metrics tracked by the first node, that a second next hop mapped to the service identifier of the plurality of next hops received from the path management hub outperforms the first next hop in at least one of the tracked performance metrics. The instructions also cause the processing device to receive, by the first node, traffic for a second connection with the service. The instructions also cause the processing device to forward, by the first node in response to determining the second next hop outperforms the first next hop, the received traffic for the second connection with the service to the second next hop.

In some embodiments, the instructions also cause the processing device to transmit, by the first node to the path management hub an indication of the first node using the second next hop to forward traffic for the service and the tracked link performance metrics.

In some embodiments, the instructions also cause the processing device to track, by the first node, link performance metrics for traffic for the service via each of the plurality of next hops. The link performance metrics tracked by the first node include, for each connection, bytes directed to the service over a period of time and bytes received from the service over a period of time. The instructions also cause the processing device to determine, by the first node using the link performance metrics tracked by the first node, a ratio of bytes directed to the service to bytes received from the service meets first reordering criteria. The instructions also cause the processing device to receive, by the first node, traffic for a second connection with the service. The instructions also cause the processing device to, in accordance with a determination that the ratio of bytes directed to the service to bytes received from the service meets the reordering criteria, forward, by the first node, the received traffic for the second connection with the service to the second next hop.

In some embodiments, the instructions also cause the processing device to track, by the first node, link performance metrics for traffic for the first connection for the service via the first hop. The instructions also cause the processing device to determine, by the first node using the link performance metrics tracked by the first node, that at least one of the link performance metrics for the first connection meets second reordering criteria. The instructions also cause the processing device to receive, by the first node, traffic for a second connection with the service. The instructions also cause the processing device to, in accordance with a determination that the at least one link performance metric for the first connection meets the second reordering criteria, forward, by the first node, the received traffic for the second connection with the service to the second next hop.

In some embodiments, the link performance metrics include, for each connection, bytes directed to each service over a period of time and bytes received from each service over a period of time. The instructions also cause the processing device to determine, by the path management hub using the link performance metrics, whether a ratio of bytes directed to the service to bytes received from the service meets context adjustment criteria. The instructions also cause the processing device to, in accordance with a determination that the ratio of bytes directed to the service to bytes received from the service meets the context adjustment criteria, selecting, by the path management hub, the context representing one or more link performance metric types.

In some embodiments, the service identifier mapped to the next hops for the plurality of optimal paths transmitted from the path management hub to the first node includes a mapping to the context representing the one or more link performance metric types.

In some embodiments, the plurality of link performance metric types includes one or more of: bandwidth, requests per second, packet loss, jitter, and latency.

In some embodiments, determining the context representing the one or more link performance metric types to be given preference for the service includes receiving, by the path management hub, a selection of the context.

In accordance with some embodiments, a system comprises a path management hub including a first processing device and a first memory coupled to the first processing device. The first memory stores instructions which, when executed by the first processing device, cause the path management hub to receive link performance metrics from each of a plurality of proxy server nodes that form a mesh network. Each of the plurality of nodes forms a portion of the mesh network via a link to each of two or more other nodes within the plurality of nodes. The link performance metrics represent a plurality of performance metric types. The instructions of the first memory also cause the path management hub to evaluate, in response to receiving the link performance metrics, a plurality of potential paths between respective first and second nodes within the plurality of nodes using the received link performance metrics to determine optimal paths for each of a plurality of metric types and/or a combination of metric types. The instructions of the first memory also cause the path management hub to determine a context representing one or more link performance metric types to be given preference for a service. The instructions of the first memory also cause the path management hub to map a service identifier for the service to a plurality of the determined optimal paths between the first node and second nodes using the one or more link performance metric types of the determined context. The instructions of the first memory also cause the path management hub to transmit, to the first node: a respective next hop for each of the plurality of mapped optimal paths and the mapping between each respective next hop and the service identifier. The first node includes a second processing device and a second memory coupled to the second processing device. The second memory stores instructions which, when executed by the second processing device, cause the first node to receive, from the path management hub, the service identifier mapped to a plurality of next hops for the plurality of mapped optimal paths. The instructions of the second memory also cause the first node to receive traffic for a first connection with the service. The instructions of the second memory also cause the first node to select, in response to determining the received traffic is for the service, a first next hop mapped to the service identifier of the plurality of next hops for the plurality of mapped optimal paths. The instructions of the second memory also cause the first node to forward the received traffic to the selected first next hop.

In some embodiments, execution of the instructions stored in the second memory further cause the first node to track link performance metrics for traffic for the service via each of the plurality of next hops. The instructions stored in the second memory also cause the first node to determine, using the link performance metrics tracked by the first node, that a second next hop mapped to the service identifier of the plurality of next hops received from the path management hub outperforms the first next hop in at least one of the tracked performance metrics. The instructions stored in the second memory also cause the first node to receive traffic for a second connection with the service. The instructions stored in the second memory also cause the first node to forward, in response to determining the second next hop outperforms the first next hop, the received traffic for the second connection with the service to the second next hop.

In accordance with some embodiments, a computer-implemented method comprises receiving, by a path management hub, link performance metrics from each of a plurality of proxy server nodes that form a mesh network. Each of the plurality of nodes forms a portion of the mesh network via a link to each of two or more other nodes within the plurality of nodes. The link performance metrics represent a plurality of performance metric types. The method also includes evaluating, by the path management hub in response to receiving the link performance metrics, a plurality of potential paths between respective first and second nodes within the plurality of nodes using the received link performance metrics to determine optimal paths for each of a plurality of metric types and/or a combination of metric types. The method also includes determining, by the path management hub, a context representing one or more link performance metric types to be given preference for a service. The method also includes mapping, by the path management hub, a service identifier for the service to a plurality of the determined optimal paths between the first node and second nodes using the one or more link performance metric types of the determined context. The method also includes transmitting, from the path management hub to the first node a respective next hop for each of the plurality of mapped optimal paths, and the mapping between each respective next hop and the service identifier.

BACKGROUND OF THE INVENTION

Content delivery networks (CDNs) aim to serve content to end-users with high availability and high performance. In particular, CDNs deploy proxy servers in multiple, geographically diverse data centers to cache and serve the content. When the content is requested, the request is directed to the node that, e.g., will require the fewest hops, is the least number of network seconds away from the client requesting the content, etc. Typically, this results in the selection of an edge node that is closest to the client. For example, a proxy server within a telecommunications service provider (TSP) network may cache and serve content to customers of the TSP to lessen demands on the network backbone and quickly and reliably deliver the content. Caching content in many locations to maximize the chances of having a proxy server close to any given client, however, can incur significant costs.

BRIEF DESCRIPTION OF THE DRAWINGS

The present embodiments are illustrated by way of example and not limitation in the figures of the accompanying drawings, in which like references indicate similar elements, and in which.

DETAILED DESCRIPTION

This document describes embodiments that deliver application or data content across a mesh network of proxy servers by dynamically computing and selecting optimal paths based upon context of the traffic. Optimal paths are selected by a path management hub using link performance metrics received from proxy server nodes that make up the mesh network and based upon a service-based context. The path management hub can be implemented as a single server or distributed system in a location or across multiple locations. Each service-based context represents one or more link performance metric types to be given preference for that service. In some embodiments, an administrator for the service provides a selection of a particular context. In some embodiments, the hub sets the context to a default setting or based upon an evaluation of traffic flow patterns for the service. As an example of selecting optimal paths, the path management hub may calculate directed graphs using various performance metrics of links along potential paths through the mesh network and select multiple paths as optimal based upon each service-based context. The path management hub maps the context-based optimal paths to the corresponding service.

Once optimal paths are selected and mapped, the path management hub distributes next hop information to the nodes. In some embodiments, a node receiving traffic for a given service uses the mapping to select a next hop provided by the path management hub and forward the traffic to that next hop. In some embodiments, one or more nodes track link performance metrics to report back to the path management hub. In some embodiments, nodes use the tracked link performance metrics to select among multiple next hops mapped to a single service.

As a result, embodiments reduce the number of locations needed to cache content or host applications in order to provide high performance. Instead, embodiments achieve high performance in delivering application or data content using intelligent selection of paths through the mesh of proxy servers. Additionally, embodiments utilize out-of-band path selection based upon a hub's global view of the mesh network as well as in-band selection based upon an individual node's evaluation of performance metrics.

Figure 1:
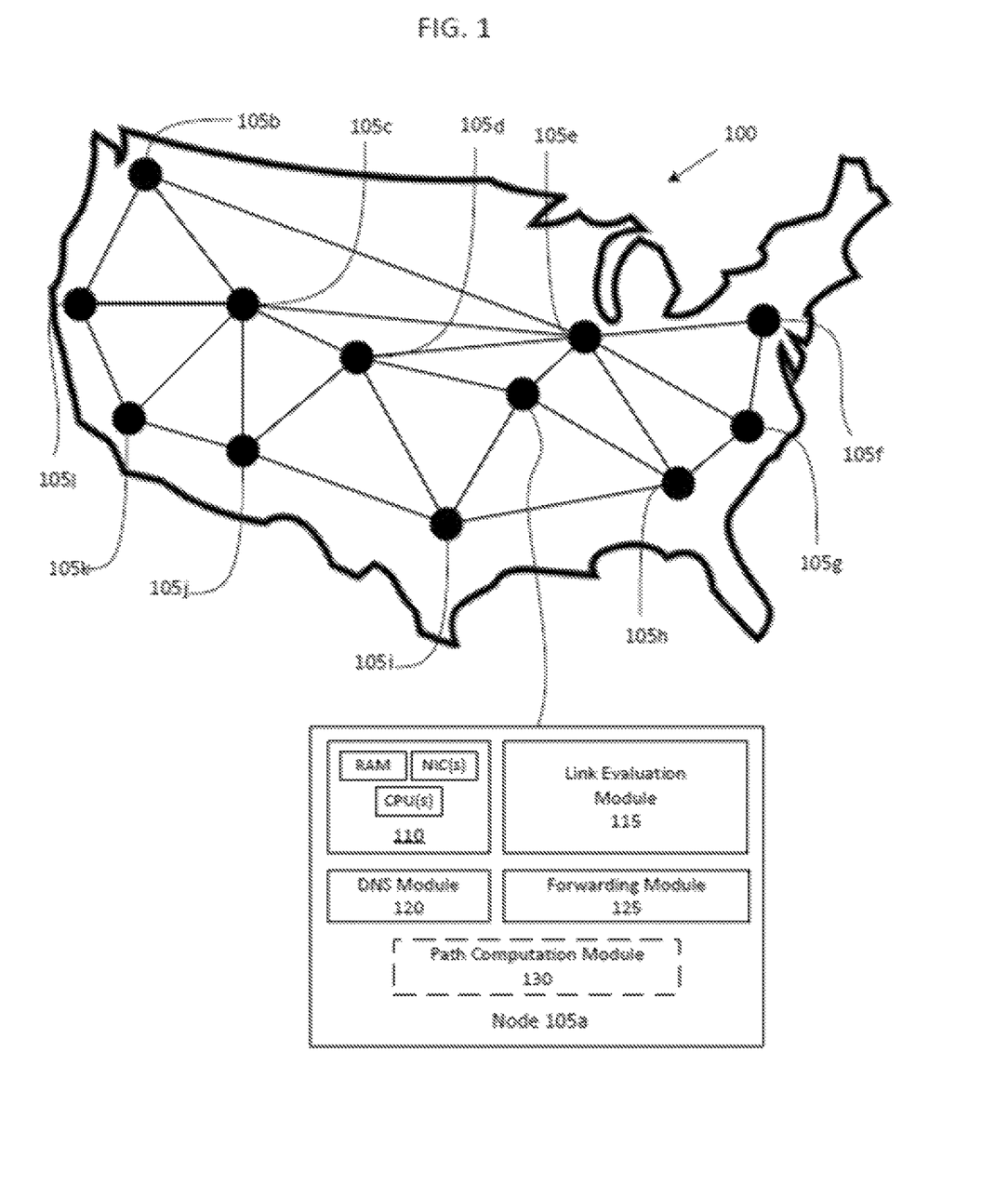
FIG. 1 illustrates, in block diagram form, an exemplary mesh network of proxy servers implementing context-aware path computation.

FIG. 1 illustrates, in block diagram form, exemplary mesh network 100 of proxy server nodes 105 (e.g., nodes 105a, 105b, 105c, 105d, 105e, 105f, 105g, 105h, 105i, 105j, 105k, and 105l) implementing context-aware path computation. In some embodiments, mesh network 100 is a content delivery network (CDN) and/or application delivery network (ADN). Mesh network 100 includes a geographically distributed set of proxy server nodes 105 deployed in multiple data centers. Mesh network 100 may include more or fewer nodes 105 than illustrated.

In some embodiments, a respective node 105 (e.g., as illustrated by node 105a) includes hardware 110. Hardware 110 includes one or more processors ("CPU(s)"), data storage and memory (e.g., "RAM"), and network interface controllers ("NIC(s)"). The data storage and memory may be used for storing data, metadata, and programs (e.g., link evaluation module 115, DNS module 120, forwarding module 125, and/or path computation module 130) for execution by the processor(s). In some embodiments, the data storage and memory may include one or more of volatile and non-volatile memories, such as Random Access Memory ("RAM"), Read Only Memory ("ROM"), a solid state disk ("SSD"), Flash, Phase Change Memory ("PCM"), and/or other types of data storage, such as magnetic disk drives, optical disk drives, etc. In some embodiments, the memory includes internal and/or distributed memory. In some embodiments, one or more buses (not shown) interconnect the various components of hardware 110. In some embodiments, NIC(s) connect one more of nodes 105 (e.g., nodes 105a-105l), via a wired and/or wireless network, with other nodes 105, client devices external to mesh network 100, and/or server devices external to mesh network 100.

In some embodiments, a respective node (e.g., as illustrated by node 105a) includes multiple modules. Each of these modules may be embodied in hardware, software, or a combination of hardware and software. Link evaluation module 115 tracks metrics between nodes 105 (e.g., nodes 105a-105l). For example, link evaluation module 115 of a first node may track bytes transmitted through the first node to a service per second per connection and bytes received by the first node from a service per second per connection. In some embodiments, these metrics provide a representation of the data flow characteristics during a connection between a client and the service. Exemplary data flow characteristics are described in further detail with reference to FIGS. 3-6. In some embodiments, link evaluation module 115 tracks other metric types, including one or more of requests per second per connection, incoming packet loss per network address, outgoing packet loss per network address, latency per network address, bandwidth per network address, jitter per network address, network utilization, traffic content (e.g., by inspecting a header, packet, or other data/metadata in transit), latency of various requests and/or responses (e.g., requests and/or responses for HTML pages, JavaScript, CSS, images, APIs and/or media), etc.

Link evaluation module 115 stores tracked metrics in data storage or memory within hardware 110. Additionally, link evaluation module 115 transmits the tracked metrics to a path management hub using NIC(s) within hardware 110. In some embodiments, link evaluation module 115 maps one or metrics to a service for the corresponding traffic. For example, link evaluation module 115 may maintain a data structure within the data storage or memory that maps an identifier for a service to metrics for traffic coming from and/or going to the service. Exemplary services include providing content for a website, streaming video, providing data for an application, etc.

In some embodiments, link evaluation module 115 injects test traffic to track metrics between a first respective node 105 (e.g., node 105a) and each of a plurality of second nodes 105 (e.g., nodes 105b-105l). For example, each respective node 105 may store a list of network addresses of other nodes 105 and data for test transmissions. Transmitting test traffic to and receiving responses from other nodes 105 enables link evaluation module 115 to track metrics for links to other nodes 105 in addition to or instead of tracking actual traffic directed to and received from one or more services.

In some embodiments, link evaluation module 115 uses the tracked link performance metrics to select a next hop for traffic, e.g., as described in greater detail with reference to FIGS. 2-6.

In some embodiments, a respective node 105 (e.g., as illustrated by node 105a) is includes domain name system (DNS) module 120. DNS module 120 stores next hop information. For example, respective nodes 105 may determine respective neighboring nodes 105 and track the next hop for traffic using an address discovery protocol. In some embodiments, next hop information is provided by a path management hub. For example, as described in greater detail herein, a path management hub may determine optimal paths per service and distribute next hop information to nodes 105 for those paths. Next hop information for a service may include a list of optimal next hops mapped to the service in ranked order. In some embodiments, link evaluation module 115 adjusts the ranked order of next hops based upon the tracked link performance metrics, e.g., as described in greater detail with reference to FIGS. 2-6.

In some embodiments, a respective node 105 (e.g., as illustrated by node 105a) includes forwarding module 125. Forwarding module 125 receives traffic from a client, service, or another node 105, determines a service and/or destination from the received traffic, and/or selects the next hop using the mapping stored by DNS module 120.

In some embodiments, a node 105 (e.g., node 105a) includes path computation module 130. In some embodiments, a node that includes path computation module 130 serves as a path management hub for mesh network 100. For example, mesh network 100 may have one active path management hub that computes and distributes optimal paths to nodes 105.

In some embodiments, path computation module 130 maintains a registry of nodes 105 within mesh network 100. In some embodiments, path computation module 130 receives link performance metrics from each of nodes 105 and determines optimal paths between nodes 105 for each of a plurality of metric types or a combination of metric types using the received link performance metrics. In some embodiments, path computation module 130 maps a service identifier to a plurality of the determined optimal paths for a context representing one or more link performance metric types and transmits a next hop for each of the plurality of mapped optimal paths, along with the mapping of the service(s) to the next hops, to one or more nodes. In some embodiments, path computation module 130 maps a context or link performance metric type to one or more of the next hops and transmits that mapping to one or more nodes. Path computation module 130, as implemented within a path management hub, is described in greater detail with reference to FIGS. 2-6.

Figure 2:
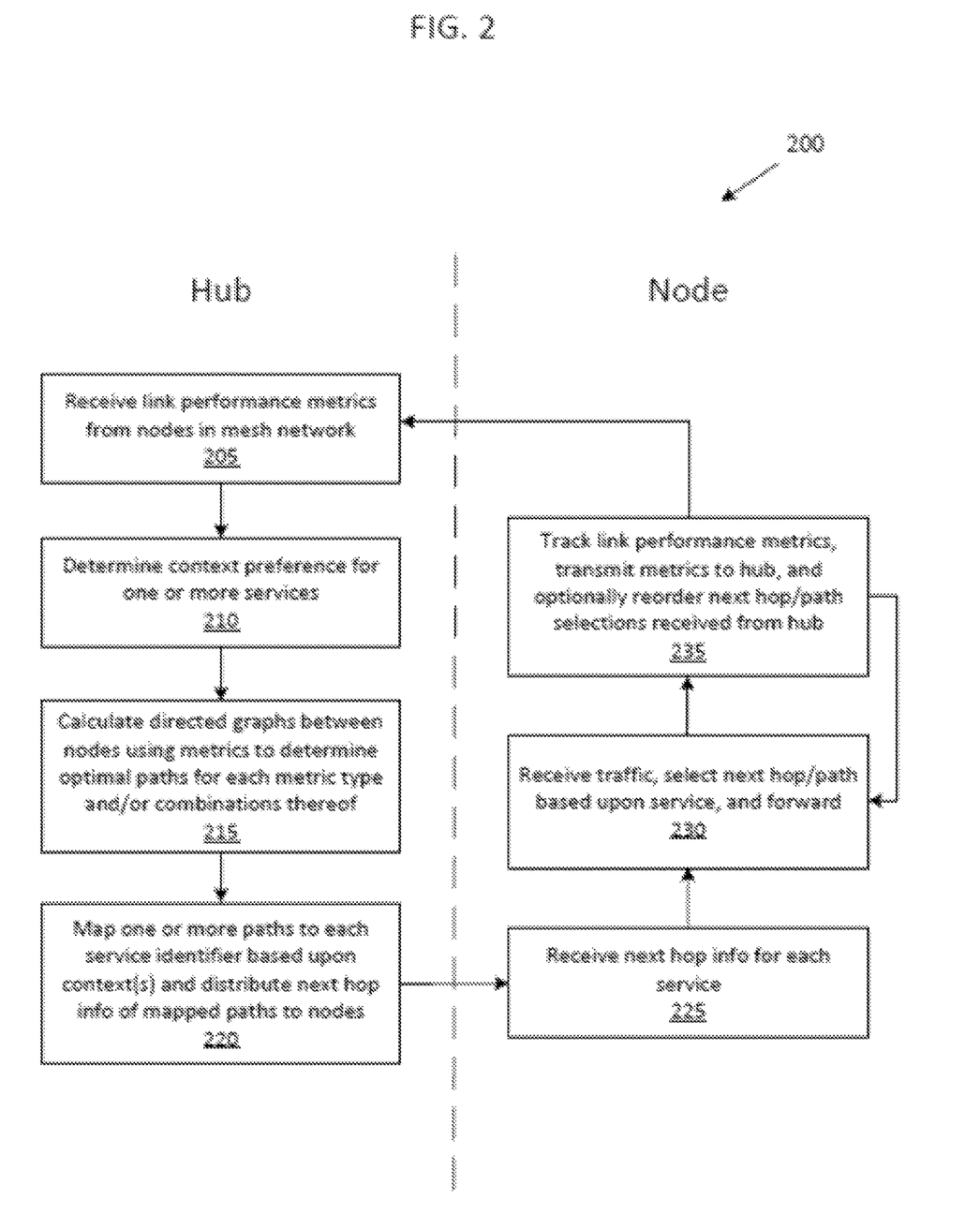
FIG. 2 is a flow chart illustrating an exemplary method of context-aware path computation and selection.

FIG. 2 is a flow chart illustrating exemplary method 200 of context-aware path computation and selection. At block 205, the path management hub receives link performance metric data from nodes 105 within mesh network 100. For example, mesh network 100 is illustrated as including twelve nodes 105a-105l, one of which (e.g., node 105a) serves as path management hub via the active use of path computation module 130. Each link evaluation module 115 of each respective node 105 tracks and transmits link performance metrics for actual and/or test traffic transmitted and/or received by that respective node 105 and transmits the link performance metrics to the path management hub. In some embodiments, the path management hub receives the link performance metrics at a regular interval for each node 105 (e.g., as defined by periods of time, number of connections evaluated, etc.). The path management hub receives the link performance metrics, e.g., via a client/server communication(s) with each respective node 105 and/or via a message queue. Received link performance metrics include one or more of: bytes transmitted through the node to a service per second per connection, bytes received by the node from a service per second per connection, an indication of a type of data flow during a connection between a client and the service as represented by the bytes transmitted/received, requests per second per connection, incoming packet loss per network address, outgoing packet loss per network address, latency per network address, bandwidth per network address, jitter per network address, network utilization, traffic content type (e.g., by inspecting a header, packet, or other data/metadata in transit), context/link performance metric type for a service as determined by a respective node 105, etc. In some embodiments, the link performance metrics are mapped to one or more of: a service, a period of time, a source address or other identifier, and a destination address or other identifier.

At block 210, the path management hub determines a context representing one or more link performance metric types for each service utilizing mesh network 100. In some embodiments, a context indicates that traffic to and/or from a service is bandwidth sensitive. In such embodiments, the path management hub will prioritize paths through mesh network 100 that provide the best performance for bandwidth. In some embodiments, a context may indicate that traffic to and/or from a service is latency sensitive. In such embodiments, the path management hub will prioritize paths through mesh network 100 that provide the best performance for latency. A context may represent multiple link performance metric types. For example, a context may indicate that traffic to and/or from a service is latency and cost sensitive. In such an example, the path management hub will prioritize paths through mesh network 100 that provide the best performance for latency while also being cost effective and/or not exceeding a cost threshold. Contexts are not limited to these examples and may represent another link performance metric type or a combination of link performance metric types.

The path management hub determines a context for a service by looking up a stored mapping between the service and the context or otherwise making a determination based upon data received from nodes 105. For example, the path management hub may receive and store a preferred context from an administrator or other representative of the service seeking to have content or application delivered via mesh network 100. Alternatively, the path management hub may receive and store a preferred context as determined by a node 105. As another alternative, the path management hub's determination includes determining that there is no preconfigured context and setting the context to a default setting.

In some embodiments, the path management hub determines context based upon a node 105, identifying a traffic type by parsing the traffic header/metadata and/or traffic payload data and transmitting the traffic type to the path management hub. For example, the path management hub may receive from a node 105 a mapping between an identifier for a service and a traffic type for that service as determined by the node 105. Traffic types may label the content, e.g., image, audio, video, application programming interface (API) requests and/or responses, voice over internet protocol (VOIP) calls, etc. Alternatively, traffic types received from nodes 105 may categorize the traffic. For example, a node 105 may categorize images and API requests and/or responses as latency sensitive traffic, streaming video as bandwidth sensitive, VOIP calls as jitter sensitive, etc.

In some embodiments, the path management hub determines context based upon data flow patterns detected by a node 105. For example, nodes 105 may track data flow, e.g., as described with reference to FIGS. 3-6, and transmit to the path management hub a mapping between an identifier for a service and a traffic type based upon the tracked data flow. For example, a node 105 may categorize traffic flows as latency sensitive traffic, bandwidth sensitive, jitter sensitive, etc. based upon bytes transmitted through the node to a service per second per connection, bytes received by the node from a service per second per connection, incoming packet volume, outgoing packet volume, symmetry between incoming and outgoing traffic, etc.

At block 215, the path management hub calculates or otherwise determines one or more optimal paths for each link performance metric type. For example, in response to receiving the link performance networks, the path management hub utilizes the received link performance metrics to assign values to each link between two nodes 105 within mesh network 100. For each link performance metric type, the path management hub calculates directed graphs between nodes 105 using the values for that performance metric type as inputs to Dijkstra's algorithm or another algorithm for determining the shortest path between nodes 105.

In some embodiments, the path management hub determines one or more optimal paths for a combination of link performance metric types. For example, the path management hub may utilize multiple link performance metric types to assign values to each link between two nodes 105. In some embodiments, utilizing multiple performance metric types includes creating a multidimensional value in which each dimension represents a performance metric type. In some embodiments, utilizing multiple performance metric types includes calculating a sum, product, or other combination of the performance metrics of each type for each link. In some embodiments, utilizing multiple performance metric types includes calculating a shortest path for a first performance metric type that does not exceed or does not fall below a threshold for a second performance metric type.

In some embodiments, assigning values to each link includes normalizing the received link performance metrics. Normalizing the received link performance metrics may include adjusting values based upon whether a high value or a low value is optimal for a given link performance metric type. For example, the shortest path for latency is based upon links with low latency while the shortest path for bandwidth is based upon links with high bandwidth. Additionally, normalizing the received link performance metrics may include weighting link performance metrics based upon link performance metric type.

In some embodiments, in determining optimal paths, the path management ranks multiple paths between nodes 105 for each link performance metric type. For example, the path management hub may determine the top two or three optimal paths between two nodes 105. If a service may be provided by multiple nodes 105 (e.g., using cached content at each of multiple nodes 105 or each of multiple nodes 105 may serve as a point of ingress/egress for an origin of a given service), the path management hub may determine the top two or three optimal paths between a first node 105 and one of the multiple other nodes. Alternatively, the path management hub determines a single optimal path between each set of two nodes 105.

At block 220, the path management hub maps a service identifier for each service to one or more of the optimal paths based upon the determined context for that service. For example, if the determined context for a service indicates a preference for high bandwidth paths, the path management hub maps an identifier for that service to the path(s) determined to be optimal for bandwidth. In an embodiment in which multiple optimal paths are determined for a context, the path management hub maps the identifier to a ranked list of the optimal paths. A service identifier is a port number, network address, combination of port number and network address, or another unique identifier for a service.

In some embodiments, the path management hub utilizes a context to map a service identifier to multiple optimal paths, each path selected as being optimal for a different link performance metric type. For example, a default context may be utilized to map a service identifier to a list including an optimal path for bandwidth, an optimal path for latency, and an optimal path for jitter. Using a determined traffic type (e.g., based upon traffic flow or inspection, as described herein), nodes 105 may select an optimal path that corresponds to the traffic type. For example, for a traffic type that is bandwidth sensitive, node 105 selects the optimal path for bandwidth.

Additionally, the path management hub distributes next hop information of the mapped optimal paths to nodes 105. For example, optimal paths may include intermediate nodes 105 between a first node 105 forwarding traffic and a second node 105 receiving the traffic. The path management hub determines the next hop along each optimal path for each node 105 for each service and transmits a mapping of a service identifier to one or more next hops for the context determined to apply to that service. In some embodiments, the path management hub includes a mapping of a context or link performance metric type the next hops when distributed to nodes 105.

At block 225, each node 105 receives next hop information from the path management hub. For example, for each service, a first node 105 receives an identifier for the service mapped to a ranked list of next hops representing other nodes 105 to which the first node is to forward traffic for the service. In some embodiments, the ranked list is mapped to both a service and a context. In some embodiments, the ranked list is mapped to a service and each next hop within the ranked list is mapped to a context. DNS module 120 stores the mapped ranked list.

At block 230, node 105 receives network traffic and forwards the traffic using the received next hop information. For example, forwarding module 125 receives network traffic that includes a domain, source address, destination address, port number, a combination of an address and port number, and/or another unique identifier associated with a service. Using the service identifier, DNS module 120 selects a next hop. In an embodiment in which node 105 receives a ranked list of next hops mapped to a service identifier, DNS module 120 selects the top ranked next hop in the list and forwarding module 125 forwards the traffic to the node 105 at the next hop.

At block 235, node 105 tracks link performance metrics. In some embodiments, link evaluation module 115 injects test traffic to track metrics between a first node 105 and each of a plurality of second nodes 105. For example, each node 105 may store a list of network addresses of other nodes 105 and data for test transmissions. In some embodiments, the stored list of network addresses is the collection of next hops received from the path management hub. Transmitting test traffic to and receiving responses from other nodes 105 enables link evaluation module 115 to track metrics (e.g., one or more of the plurality of link performance metric types described in this document) for links to other nodes 105 in addition to or instead of tracking actual traffic directed to and received from one or more services. In some embodiments, link evaluation module 115 transmits and receives test traffic via forwarding module 125 in response to the expiration of a regular time interval, the completion of a threshold number of connections, or at another interval/threshold.

Node 105 transmits tracked link performance metrics to the path management hub. In some embodiments, link evaluation module 115 transmits tracked link performance metrics to the path management hub upon completion of evaluation a batch of links. In some embodiments, link evaluation module 115 transmits tracked link performance metrics as determined.

Link evaluation module 115 optionally reorders next hop information stored by DNS module 120 based upon tracked link performance metrics. As a result of such a reordering, node 105 makes internal/in-band adjustments to the optimal paths in between external/out-of-band adjustments to the optimal paths made by the path management hub. For example, link evaluation module 115 may determine, using the tracked link performance metrics, that the top ranked next hop as determined by the path management hub is no longer the optimal path for a given context. As a specific example, the next hop info received by node 105 indicates that a service is mapped to a context configured to prioritized bandwidth and three next hops based upon the context. In response to link evaluation module 115 determining that tracked link performance metrics demonstrate that the second next hop in the ranked list outperforms the first next hop in the ranked list in bandwidth, link evaluation module reorders the ranked list to promote the second next hop to first.

In some embodiments, link evaluation module 115 makes the determination to reorder the ranked list of next hops for a service by determining which link performance metric(s) to use to evaluate a ranked list of next hops for a given service. For example, a context identifier received from the path management hub along with the service and mapped next hops for the service may be resolved by link evaluation module 115 as representing one or more link performance metrics.

In some embodiments, link evaluation module 115 makes the determination to reorder the ranked list of next hops for a service by inspecting traffic for that service. For example, by inspecting a header, packet, or other data/metadata in transit, link evaluation module 115 determines a traffic type for that service. Traffic types may label the content, e.g., image, audio, video, application programming interface (API) requests and/or responses, voice over internet protocol (VOIP) calls, etc. and/or map the traffic type to a context/link performance metric type. Link evaluation module 115 reorders the ranked list of next hops if any lower ranked next hop outperforms a higher ranked next hop in the tracked link performance metric of the determined link performance metric type for the traffic.

In some embodiments, the ranked list may include next hops that prioritize different contexts or link performance metric types. In such an embodiment, link evaluation module 115 reorders the ranked list of next hops if any lower ranked next hop prioritizes the determined link performance metric type for the traffic and the top ranked next hop does not.

In some embodiments, link evaluation module 115 makes the determination to reorder the ranked list of next hops for a service based upon estimating the load upon a link, node 105, or service. For example, a service may be provided by multiple origin servers coupled to different nodes 105 or by different nodes 105 as proxies. The tracked link performance metrics may provide an indication of a path, node 105, or origin that is less loaded and/or a path, node 105, or origin that has exceeded a threshold load value. In response to determining there is a less loaded option or in response to determining the top ranked next hop is an option that exceeds a load threshold, link evaluation module 115 reorders the ranked list to provide load balancing, throttle traffic, etc.

In some embodiments, link evaluation module 115 makes the determination to reorder the ranked list of next hops for a service by characterizing traffic flow data for the service. For example, traffic flows may be characterized as corresponding to a context or one or more link performance metric types. The context or link performance metric type(s) may be used to evaluate the link performance metrics and reorder next hops as described above.

Method 200 continues, in parallel, to block 205 and block 230. The path management hub receives updated link performance metrics from nodes 105 and updates optimal paths and the corresponding next hop information as described with reference to blocks 205 through 220. Additionally, in the meantime, the node 105 continues to receive and forward traffic, track link performance metrics, and optionally reorder next hops as described with reference to blocks 230 and 235.

FIGS. 3-6 illustrate exemplary traffic flows used to determine a context representing one or more link performance metric types to be given preference for a service. For example, link evaluation module 115 may track as a part of the link performance metrics, per connection, bytes transmitted per second through the node to a service and/or bytes received per second by the node from a service. Link evaluation module 115 may perform determinations as described with regard to FIGS. 3-6 to determine whether next hop reordering criteria and/or context adjustment criteria are met.

Figure 3:
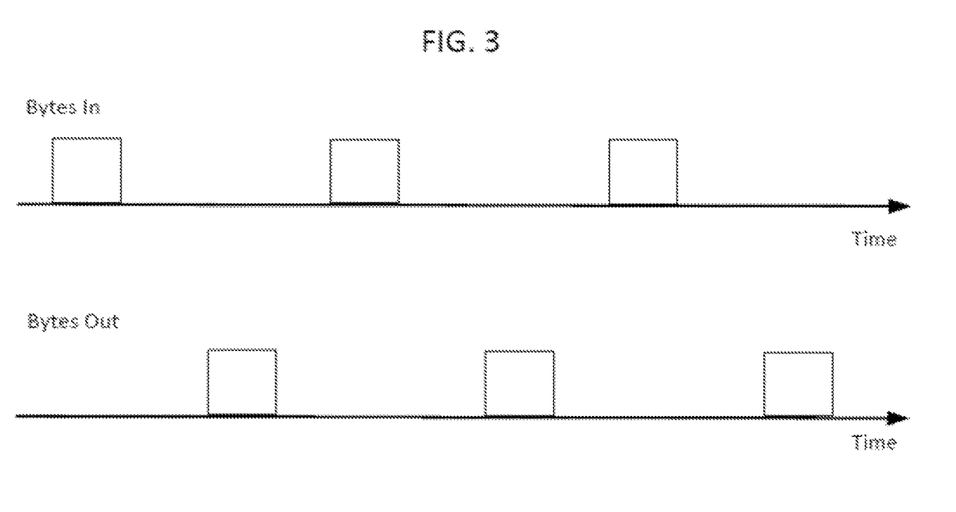
FIGS. 3-6 illustrate exemplary traffic flows used to determine a context representing one or more link performance metric types to be given preference for a service.

FIG. 3 illustrates an exemplary traffic flow for request(s) and response(s) for files. For example, a service may provide one or more Cascading Style Sheets (CSS), JavaScript, HyperText Markup Language (HTML) files, images, or other files. As illustrated, the traffic flow for requests and responses for such files may result in relatively small amounts of bytes per second in and out. Additionally, the illustrated traffic flow of such files demonstrates a relatively equal ratio of bytes in as compared to bytes out. Using the volume and/or ratio of bytes in and out, link evaluation module 115 determines that the next hop for the traffic should prioritize latency. For example, link evaluation module 115 determines that the volume of bytes in and/or volume of bytes out (and/or ratio of bytes in to bytes out) meets reordering criteria (e.g., a volume of byes out is below a threshold value and/or a ratio of bytes in to bytes out is within a predefined range of ratio values) and, thus, maps to a context that prioritizes latency.

Figure 4:
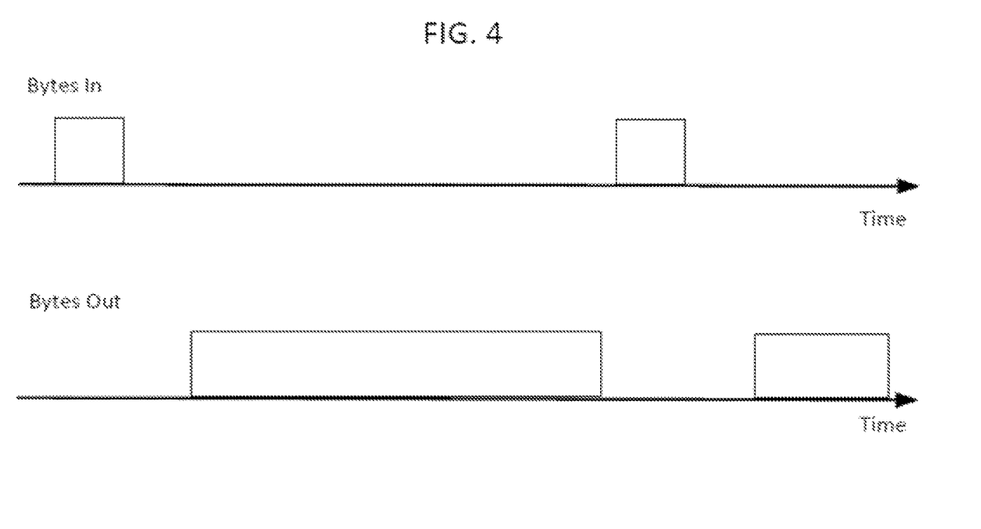

FIG. 4 illustrates an exemplary traffic flow for request(s) and response(s) for a streaming service. The illustrated traffic flow shows relatively small amounts of bytes per second in and larger amounts of bytes per second out. Using the volume of bytes out and/or ratio of bytes per second in to bytes per second out, link evaluation module 115 determines that the next hop for the traffic should prioritize bandwidth. For example, link evaluation module 115 determines that reordering criteria are met when, for example, the volume of bytes out is above a threshold value and/or a ratio of bytes in to bytes out (e.g., over a predetermined time period) is below a threshold ratio and, thus, maps to a context that prioritizes bandwidth.

Figure 5:
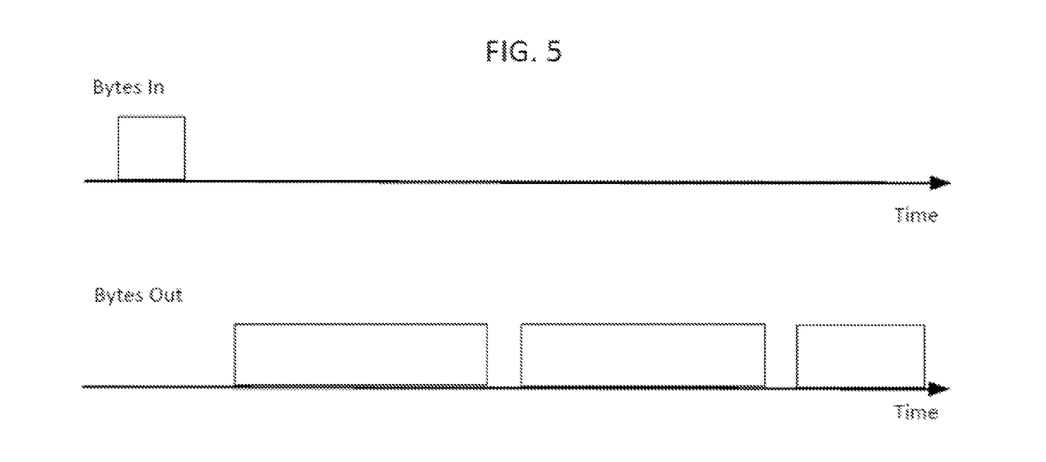

FIG. 5 illustrates an exemplary traffic flow for request(s) and response(s) for a streaming service that transmits data in a chunked manner. Similar to FIG. 4, the illustrated traffic flow shows relatively small amounts of bytes per second in and larger amounts of bytes per second out. Using the volume and/or ratio of bytes in and out, link evaluation module 115 determines that the next hop for the traffic should prioritize bandwidth. For example, link evaluation module 115 determines that reordering criteria are met when, for example, the volume of bytes out is above a threshold value and/or a ratio of volume of bytes in to bytes out (e.g., over a predetermined time period) is below a threshold ratio and, thus, maps to a context that prioritizes bandwidth.

Figure 6:
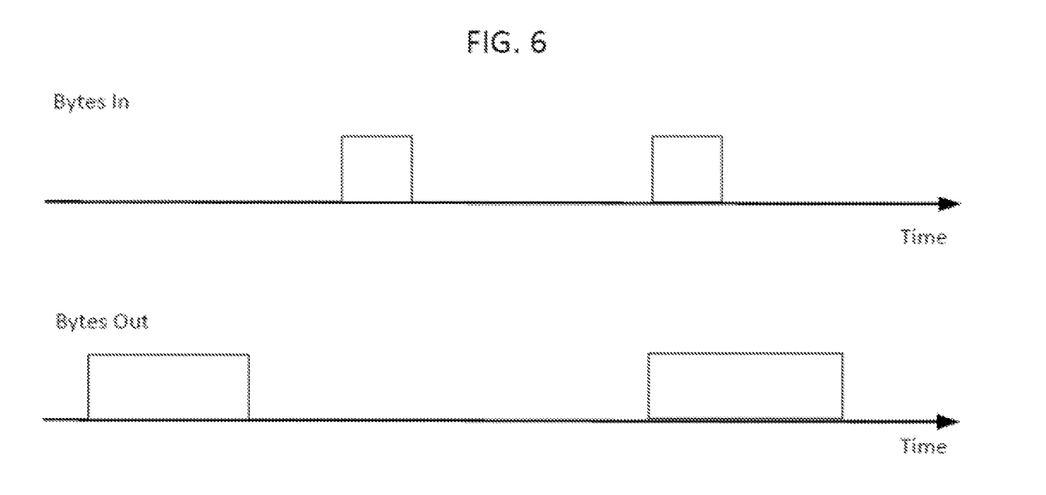

FIG. 6 illustrates an exemplary traffic flow for request(s) and response(s) for a frame-based protocol. For example, for the HTTP/2 protocol, it is possible that the server starts sending data as soon as the client connects and before a request or other bytes are sent by the client.

It will be apparent from this description that aspects of the inventions may be embodied, at least in part, in software. That is, link evaluation module 115, DNS module 120, forwarding module 125, path computation module 130, and/or computer-implemented method 200 may be implemented or otherwise carried out in a computer system or other data processing system, such as one or more respective nodes 105, in response to its processor executing sequences of instructions contained in a memory or other non-transitory machine-readable storage medium. The software may further be transmitted or received over a network (not shown) via a network interface. In various embodiments, hardwired circuitry may be used in combination with the software instructions to implement the present embodiments. Thus, the techniques are not limited to any specific combination of hardware circuitry and software, or to any particular source for the instructions executed by a node 105. It will also be appreciated that additional components, not shown, may also be part of nodes 105, and, in certain embodiments, fewer components than that shown in FIG. 1 may also be used in nodes 105.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards, solid state drives (SSD), or other type of non-transitory computer-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention(s) have been described with reference to specific exemplary embodiments thereof. Various embodiments and aspects of the invention(s) are described with reference to details discussed in this document, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used in this document, the term "exemplary" refers to embodiments that serve as simply an example or illustration. The use of exemplary should not be construed as an indication of preferred examples. Blocks with dashed borders (e.g., large dashes, small dashes, dot-dash, dots) are used to illustrate virtualized resources or, in flow charts, optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described in this document may be performed with fewer or more features/blocks or the features/blocks may be performed in differing orders. Additionally, the methods described in this document may be repeated or performed in parallel with one another or in parallel with different instances of the same or similar methods.

What is claimed is:

1. A computer-implemented method, comprising:

receiving link performance metrics from a plurality of proxy server nodes that form a mesh network, wherein the link performance metrics represent a plurality of link performance metric types;

evaluating a plurality of potential paths between a first proxy server node and a second proxy server node, using the link performance metrics, to determine a respective next hop of a plurality of next hops for each of a plurality of optimal paths corresponding to each link performance metric type and/or a combination of link performance metric types;

determining, for each service of a plurality of services between the first proxy server node and the second proxy server node, a context representing one or more link performance metric types;

mapping each service of the plurality of services to a corresponding optimal path of the plurality of optimal paths; and transmitting, to the first proxy server node, the mapping of the plurality of services to the plurality of optimal paths, thereby causing the first proxy server node to forward received traffic for a service to a first next hop.

2. The computer-implemented method of claim 1, further comprising:

receiving, from the first proxy server node, an indication of the first proxy server node using a second next hop to forward traffic for the service; and updating mapping of the plurality of services to the plurality of optimal paths based on receiving the indication of the first proxy server node using the second next hop.

3. The computer-implemented method of claim 1, further comprising:

tracking link performance metrics for traffic for the service via each of the plurality of next hops; and in accordance with a determination that a second next hop of the plurality of next hops outperforms the first next hop in at least one of the link performance metrics for traffic for the service, (i) updating mapping of the plurality of services to the plurality of optimal paths, and (ii) transmitting, to the first proxy server node, the mapping of the plurality of services to the plurality of optimal paths, thereby causing the first proxy server node to forward received traffic for the service to a second next hop.

4. The computer-implemented method of claim 1, further comprising:

tracking link performance metrics for traffic for the service via each of the plurality of next hops, wherein the link performance metrics tracked include, for each connection, bytes directed to the service over a period of time and bytes received from the service over a period of time; and in accordance with a determination that a ratio of bytes directed to the service to bytes received from the service is above a first threshold value, based on the link performance metrics for traffic for the service, (i) updating mapping of the plurality of services to the plurality of optimal paths, and (ii) transmitting, to the first proxy server node, the mapping of the plurality of services to the plurality of optimal paths, thereby causing the first proxy server node to forward received traffic for the service to a second next hop.

5. The computer-implemented method of claim 1, further comprising:

tracking link performance metrics for traffic for the service via each of the plurality of next hops, wherein the link performance metrics tracked include, for each connection, bytes directed to the service over a period of time and bytes received from the service over a period of time; and in accordance with a determination that a ratio of bytes directed to the service to bytes received from the service meets first reordering criteria, based on the link performance metrics for traffic for the service, (i) updating mapping of the plurality of services to the plurality of optimal paths, and (ii) transmitting, to the first proxy server node, the mapping of the plurality of services to the plurality of optimal paths, thereby causing the first proxy server node to forward received traffic for the service to a second next hop.

6. The computer-implemented method of claim 1, further comprising:

tracking link performance metrics for traffic for a first connection for the service via the first next hop; and in accordance with a determination that at least one link performance metric for the first connection is above a second threshold value, causing the first proxy server node to forward traffic for a second connection with the service to a second next hop.

7. The computer-implemented method of claim 1, further comprising:

tracking link performance metrics for traffic for a first connection for the service via the first next hop; and in accordance with a determination that at least one link performance metric for the first connection meets a second reordering criteria, causing the first proxy server node to forward traffic for a second connection with the service to a second next hop.

8. The computer-implemented method of claim 1, wherein the link performance metrics include, for each connection, bytes directed to each service over a period of time and bytes received from each service over a period of time, the method further comprising:

determining, using the link performance metrics, whether a ratio of bytes directed to the service to bytes received from the service is above a third threshold value; and in accordance with a determination that the ratio of bytes directed to the service to bytes received from the service is above the third threshold value, selecting the context representing one or more link performance metric types.

9. The computer-implemented method of claim 1, wherein the link performance metrics include, for each connection, bytes directed to each service over a period of time and bytes received from each service over a period of time, the method further comprising:

determining, using the link performance metrics, whether a ratio of bytes directed to the service to bytes received from the service meets context adjustment criteria; and in accordance with a determination that the ratio of bytes directed to the service to bytes received from the service meets the context adjustment criteria, selecting the context representing one or more link performance metric types.

10. The computer-implemented method of claim 1, wherein the plurality of link performance metric types includes one or more of: bandwidth, requests per second, packet loss, jitter, and latency.

11. A non-transitory computer-readable medium storing instructions, which when executed by a processing device, cause the processing device to perform a method comprising:

receiving link performance metrics from a plurality of proxy server nodes that form a mesh network, wherein the link performance metrics represent a plurality of link performance metric types;

evaluating a plurality of potential paths between a first proxy server node and a second proxy server node, using the received link performance metrics, to determine a respective next hop of a plurality of next hops for each of a plurality of optimal paths corresponding to each link performance metric type and/or a combination of link performance metric types;

determining, for each service of a plurality of services between the first proxy server node and the second proxy server node, a context representing one or more link performance metric types;

mapping each service of the plurality of services to a corresponding optimal path of the plurality of optimal paths; and transmitting, to the first proxy server node, the mapping of the plurality of services to the plurality of optimal paths, thereby causing the first proxy server node to forward received traffic for a service to a first next hop.

12. The non-transitory computer-readable medium of claim 11, the method further comprising:

receiving, from the first proxy server node, an indication of the first proxy server node using a second next hop to forward traffic for the service; and updating mapping of the plurality of services to the plurality of optimal paths based on receiving the indication of the first proxy server node using the second next hop.

13. The non-transitory computer-readable medium of claim 11, the method further comprising:

tracking link performance metrics for traffic for the service via each of the plurality of next hops; and in accordance with a determination that a second next hop of the plurality of next hops outperforms the first next hop in at least one of the link performance metrics for traffic for the service, (i) updating mapping of the plurality of services to the plurality of optimal paths, and (ii) transmitting, to the first proxy server node, the mapping of the plurality of services to the plurality of optimal paths, thereby causing the first proxy server node to forward received traffic for the service to a second next hop.

14. The non-transitory computer-readable medium of claim 11, the method further comprising:

tracking link performance metrics for traffic for the service via each of the plurality of next hops, wherein the link performance metrics tracked include, for each connection, bytes directed to the service over a period of time and bytes received from the service over a period of time; and in accordance with a determination that a ratio of bytes directed to the service to bytes received from the service is above a first threshold value, based on the link performance metrics for traffic for the service, (i) updating mapping of the plurality of services to the plurality of optimal paths, and (ii) transmitting, to the first proxy server node, the mapping of the plurality of services to the plurality of optimal paths, thereby causing the first proxy server node to forward received traffic for the service to a second next hop.

15. The non-transitory computer-readable medium of claim 11, the method further comprising:

tracking link performance metrics for traffic for the service via each of the plurality of next hops, wherein the link performance metrics tracked include, for each connection, bytes directed to the service over a period of time and bytes received from the service over a period of time; and in accordance with a determination that a ratio of bytes directed to the service to bytes received from the service meets first reordering criteria, based on the link performance metrics for traffic for the service, (i) updating mapping of the plurality of services to the plurality of optimal paths, and (ii) transmitting, to the first proxy server node, the mapping of the plurality of services to the plurality of optimal paths, thereby causing the first proxy server node to forward received traffic for the service to a second next hop.

16. The non-transitory computer-readable medium of claim 11, wherein the link performance metrics include, for each connection, bytes directed to each service over a period of time and bytes received from each service over a period of time, the method further comprising:

tracking link performance metrics for traffic for a first connection for the service via the first next hop; and in accordance with a determination that at least one link performance metric for the first connection is above a second threshold value, causing the first proxy server node to forward traffic for a second connection with the service to a second next hop.

17. The non-transitory computer-readable medium of claim 11, the method further comprising:

tracking link performance metrics for traffic for a first connection for the service via the first next hop; and in accordance with a determination that at least one link performance metric for the first connection meets a second reordering criteria, causing the first proxy server node to forward traffic for a second connection with the service to a second next hop.

18. The non-transitory computer-readable medium of claim 11, wherein the link performance metrics include, for each connection, bytes directed to each service over a period of time and bytes received from each service over a period of time, the method further comprising:

determining, using the link performance metrics, whether a ratio of bytes directed to the service to bytes received from the service is above a third threshold value; and in accordance with a determination that the ratio of bytes directed to the service to bytes received from the service is above the third threshold value, selecting the context representing one or more link performance metric types.

19. The non-transitory computer-readable medium of claim 11, wherein the link performance metrics include, for each connection, bytes directed to each service over a period of time and bytes received from each service over a period of time, the method further comprising:

determining, using the link performance metrics, whether a ratio of bytes directed to the service to bytes received from the service meets context adjustment criteria; and in accordance with a determination that the ratio of bytes directed to the service to bytes received from the service meets the context adjustment criteria, selecting the context representing one or more link performance metric types.

20. A system comprising:

a path management hub including a first processing device and a first memory coupled to the first processing device, wherein the first memory stores instructions which, when executed by the first processing device, cause the path management hub to:

receive link performance metrics from a plurality of proxy server nodes that form a mesh network, wherein the link performance metrics represent a plurality of link performance metric types;

evaluate a plurality of potential paths between a first proxy server node and a second proxy server node, using the received link performance metrics, to determine a respective next hop of a plurality of next hops for each of a plurality of optimal paths corresponding to each link performance metric type and/or a combination of link performance metric types;

determine, for each service of a plurality of services between the first proxy server node and the second proxy server node, a context representing one or more link performance metric types;
map each service of the plurality of services to a corresponding optimal path of the plurality of optimal paths;
transmit, to the first proxy server node, the mapping of the plurality of services to the plurality of optimal paths, thereby causing the first proxy server node to forward received traffic for a service to a first next hop;
receive, from the first proxy server node, an indication of the first proxy server node using a second next hop to forward traffic for the service; and
update mapping of the plurality of services to the plurality of optimal paths based on receiving the indication of the first proxy server node using the second next hop.

* * * * *